Patented Feb. 27, 1923.

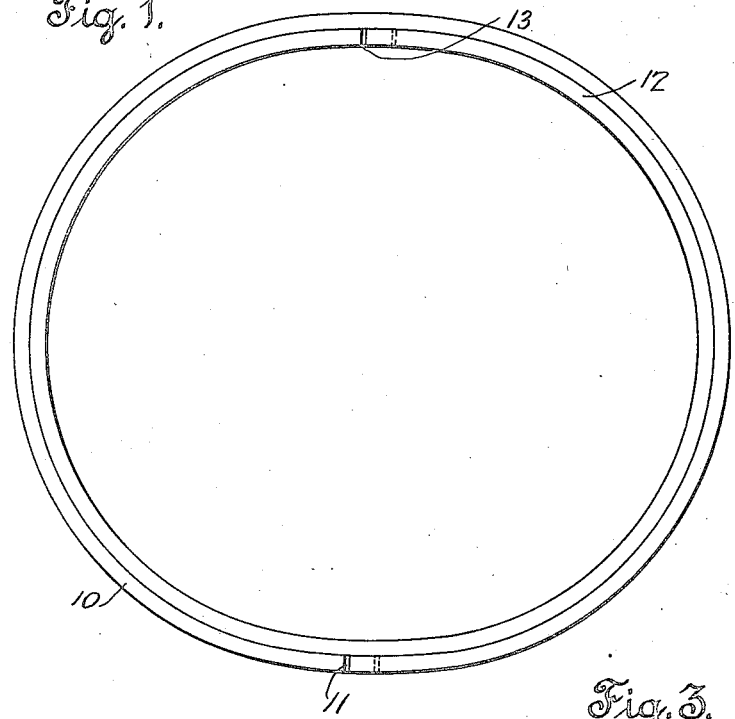
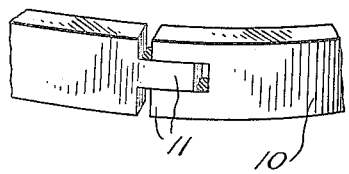
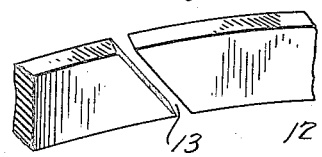
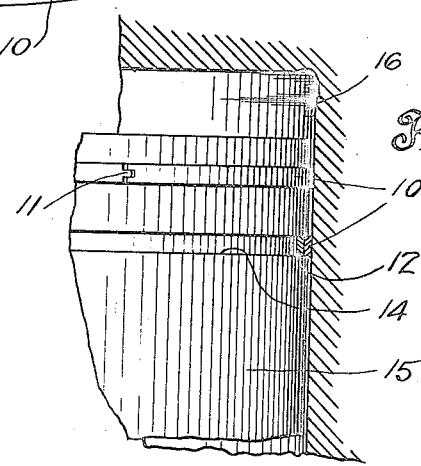

1,446,658

UNITED STATES PATENT OFFICE.

HENRY E. PELLETIER, OF NEWARK, NEW JERSEY, ASSIGNOR TO HAROLD DEPEW, OF ELIZABETH, NEW JERSEY.

PISTON RING.

Application filed August 13, 1921. Serial No. 491,987.

*To all whom it may concern:*

Be it known that I, HENRY E. PELLETIER, a citizen of the United States, residing at Newark, in the county of Essex and State of New Jersey, have invented new and useful Improvements in Piston Rings, of which the following is a specification.

The principal purpose of this invention is to produce a piston packing ring of novel construction and unusual merit, the same being used in the ordinary manner in the annular grooves of pistons reciprocating in cylinders, whereby leakage and consequent loss of energy is prevented.

Another object is to provide a piston ring comprised of two independent members, each performing a separate function and so combined as to constitute an effective device.

A further object is to so design the ring that its members may be made direct from strip material in an easy and inexpensive manner.

These and other like objects are attained by the novel design, construction and combination of parts hereinafter described and shown in the accompanying drawing, forming an essential part of this disclosure, and in which:—

Figure 1 is a plan view of an assembled ring prepared for use.

Figure 2 is an enlarged fragmentary perspective view of the outer ring at its joint.

Figure 3 is a similar view of the inner ring.

Figure 4 is a diagrammatic view, partially in section, showing the adaptation of the rings.

Contrary to the usual custom these rings are made in two separate portions, respectively inner and outer, each portion being of different material, the outer being adapted to receive wear and the inner to provide the necessary resiliency.

A further peculiarity is that both the inner and outer elements are formed of material of uniform thickness and width and rolled to produce an oval or elliptical shape in contradistinction to circular rings usually employed.

Referring to the drawings in detail, the numeral 10 designates the outer element, the same being made of soft steel or cast iron, the thickness of the metal being substantially one-fourth its width and is uniform throughout, the joint 11 being stepped or tenoned and mortised as shown.

The inner element 12 is of like cross section but made of tempered steel having a tension of approximately fifty percent more than the other ring, its joint 13 being preferably plain as shown.

The joints of the inner and outer elements are disposed on opposite sides of the ring, which as clearly indicated, is elliptical, its short diameter being approximately ninety percent of its long diameter and the joints are preferably arranged along the shorter sides.

The inner ring may be further stiffened by peening or hammering, its function being merely that of a spring and the outer ring provided with a finished surface adapted to slide without permitting leakage in the cylinder, which is of course truly round, the arrangement being clearly shown in Figure 4.

These rings are preferably formed by rolling into the oval shape indicated and fitted so that the inner element reposes neatly within the outer, both assuming the shape of true cylindrical rings when entered in the annular recesses 14 of the piston 15 and passed within the cylinder bore 16.

The peculiar shape and construction of the rings has been found in practice to produce superior results and it is obvious that their construction is relatively simple.

Although the foregoing is descriptive of the preferred embodiment of the invention, it will be apparent that minor changes may be made in its construction, without the exercise of invention or conflicting with the scope of the claims hereto appended.

Having thus described my invention, what I claim as new and desire to secure by Letters Patent, is:—

1. A piston ring comprised of an inner elliptic resilient split member under tension and an outer elliptic split element of relatively soft metal tightly encircling said inner member, the split end of one ring member being disposed diametrically opposite the split end of the other ring member, both of said members being capable of assuming a cylindrical shape when in operation.

2. An elliptical piston ring of composite construction having a tensioned inner element with a joint disposed on one of the shorter sides of the ring and an outer softer member having a joint disposed on the opposite side of the ring, said elements being tightly fitted and adapted to be sprung into a cylindrical shape when in use.

This specification signed and witnessed this 12th day of August, 1921.

HENRY E. PELLETIER.

Witnesses:
FRED'K C. FISCHER,
MELWOOD R. FOUST.